United States Patent [19]

Spendlove

[11] Patent Number: 6,043,302

[45] Date of Patent: Mar. 28, 2000

[54] IMPACT ABSORBING MACADAM

[76] Inventor: Peter David Spendlove, Mill House, Main St., Ingoldsby, Grantham Lincolnshire NG33 4ER, United Kingdom

[21] Appl. No.: 08/973,316

[22] PCT Filed: May 23, 1996

[86] PCT No.: PCT/GB96/01240

§ 371 Date: Mar. 23, 1998

§ 102(e) Date: Mar. 23, 1998

[87] PCT Pub. No.: WO96/37658

PCT Pub. Date: Nov. 28, 1996

[30] Foreign Application Priority Data

May 26, 1995 [GB] United Kingdom .................... 9511162

[51] Int. Cl.$^7$ .................................................. C08K 5/01
[52] U.S. Cl. ............................ 524/59; 524/66; 524/68; 524/505; 524/526; 524/63; 524/64
[58] Field of Search ................... 524/66, 68, 59, 524/505, 526, 63, 64

[56] References Cited

U.S. PATENT DOCUMENTS

| | | | |
|---|---|---|---|
| 2,863,841 | 12/1958 | Bernier et al. | 524/59 |
| 3,978,014 | 8/1976 | Van Beem et al. | 524/505 |
| 4,082,888 | 4/1978 | Portin | 524/68 |
| 4,221,603 | 9/1980 | Trujillo | 106/284.01 |
| 4,381,357 | 4/1983 | von der Wettern et al. | 524/68 |
| 4,490,493 | 12/1984 | Mikols | 524/505 |
| 5,114,483 | 5/1992 | Graf | 524/505 |
| 5,436,285 | 7/1995 | Caysyn et al. | 524/68 |

FOREIGN PATENT DOCUMENTS 410031 3/1966 Switzerland .

OTHER PUBLICATIONS

Endres et al. Industrial and Engineering Chemistry, vol. 43(2), pp. 334–340, Feb. 1951.
International Search Report for Application PCT/GB 96/01240 dated Sep. 11, 1996.
Dialog computer printout for EP 0 049 485 (2 pp.) 1998.
Dialog computer printout for WO 92 21820 (2 pp.) 1998.

*Primary Examiner*—David W. Wu
*Assistant Examiner*—Ling-Siu Choi
*Attorney, Agent, or Firm*—Webb Ziesenheim Logsdon Orkin & Hanson, P.C.

[57] ABSTRACT

An impact absorbing macadam comprises 10 to 75% (preferably 25 to 45%) of a particulate rubber having a particle size of up to 40 mm, 25 to 90% (preferably 45 to 65%) of an aggregate having a particle of up to 40 mm and from 5 to 9% of a polymer modified bituminous binder. Typically such a macadam has a void volume, interconnected or unconnected, of from 5 to 25%. The polymer which modifies the bituminous binder is preferably an unbranched styrene butadiene styrene block copolymer forming about 7% of the modified binder. The macadam is suitable as a base for sports pitches and athletic tracks without a rubber shock pad overlay.

15 Claims, No Drawings

IMPACT ABSORBING MACADAM

BACKGROUND OF THE INVENTION

The invention relates to an impact absorbing macadam suitable for roads, railways, synthetic sports pitches, atheletics tracks, children's safety surfaces and other applications.

Macadam, also called flexible pavement, is a combination of aggregate, which may be naturally occurring or may be crushed rock, and a binder which is usually a bitumen. It may be produced by raising the temperature of both components to 150° C.–180° C., and mixing so that the binder coats the surface of the aggregate. Alternatively, an emulsion of bitumen in water may be used instead of a hot binder, in which case the resulting macadam is referred to as a cold macadam or as emulsion macadam. Macadams are of a granular nature and employ predominantly a single or nominal sized aggregate, the size varying according to the requirement. For instance a macadam may be available with nominal aggregate sizes of 3 mm, 6 mm, 10 mm, 14 mm, 20 mm, 28 mm or 40 mm. The nominal sized aggregate may be combined with smaller sizes in varying proportions to provide an open textured, medium textured or dense macadam. The macadam is placed by hand raking or paving machine and is rolled.

The invention provides an impact absorbing macadam comprising from 10 to 75% by weight of particulate rubber having a particle size of up to 40 mm, from 25 to 90% by weight of an aggregate having a particle size of up to 40 mm and from 5 to 9% by weight of a polymer modified bituminous binder.

SUMMARY OF THE INVENTION

DETAILED DESCRIPTION OF THE INVENTION

The invention provides an impact absorbing macadam comprising from 10 to 75% by weight of particulate rubber having a particle size of up to 40 mm, from 25 to 90% by weight of an aggregate having a particle size of up to 40 mm and from 5 to 9% by weight of a polymer modified bituminous binder.

The impact absorbing macadam of the invention may have a void volume of from 5 to 25%, preferably 17%. The voids may be interconnected, that is allowing a natural path of drainage, the preferred range then being from 15 to 25%. The voids may alternatively be unconnected, that is having a continuous particle size distribution approximating to the maximum density curve, the preferred range then being from 5 to 20%. The macadam may be formulated so as to be open textured, medium textured or dense.

The particulate rubber may be virgin rubber or may be recycled rubber, for example that obtained by grinding used vehicle tyres. Preferably the macadam contains from 25 to 45% of the particulate rubber. The preferred particle sizes are up to 15 mm, and most preferably from 4 to 10 mm. Particulate rubber of different particle sizes may be used, but preferably 10 mm size particles are included.

The aggregate may be any aggregate conventionally used in the production of macadams, either naturally occurring or an industrial by-product. Coarse aggregates, which are those having particle sizes above 2.36 mm, may be included. These course aggregates are preferably of a particle size up to 15 mm. Most preferably the coarse aggregates are of sizes similar to those of the rubber particles used, and macadam according to the invention may contain more than one particle size, e.g. 10 mm aggregate and 6 mm aggregate. Fine aggregates, also known as sands, which are those having particle sizes above 75 microns but below 2.36 mm, may be included in amounts up to 35% by weight of a macadam according to the invention. Fillers, which are ultra-fine aggregates having particle sizes below 75 microns, must be included and may constitute up to 10% by weight of a macadam according to the invention.

The polymer modified bituminous binder comprises an elastomeric polymer, a plastomeric polymer or a mixture thereof in admixture with a compatible bitumen. Suitable polymers include unbranched styrene butadiene styrene block copolymer and styrene butadiene rubber. The binder most suitably constitutes from 6.5 to 7.5% by weight of a macadam according to the invention. The polymer preferably constitutes up to 11% by weight, and more preferably from 6 to 8% by weight, of the binder.

Other additives and components conventionally used in macadams, such as colourings, anti-stripping additives and deferred met agents, e.g. kerosene, may be included in the macadam according to the invention.

The macadam of the invention may be prepared using a conventional asphalt mixing plant having a separate means to access the particle rubber into the mixer bowl. A dry mix of aggregate and filler is preheated to 200° C.±20° C. To this is added the rubber particulate either at ambient temperature or preferably pre-heated to a softening temperature dependent on the requirement of the final mix but up to 100° C. Following admixture, the polymer modified bituminous binder at a temperature of from 150° C. to 200° C., preferably 180° C., is added and further mixing is effected. The resultant mix can be laid using conventional plant by hand or placed in moulds and compacted to a predetermined void content. A cold macadam or emullion macadam method of preparation may alternatively be used.

It is believed that, when the macadam according to the invention is prepared, a molecular link between the particulate rubber surfaces and the polymer of the polymer modified bituminous binder is formed. Much of the rubber, however, remains solid and by bedding between the crushed rock aggregate particles, provides a shock absorbency to the laid, rubberized macadam. Upon subjection of the macadam, to imposed stress, deformation of the rubber particles occurs. This in turn tensions or compresses the bitumen. Upon release of the imposed Stress the rubber, which is predominantly elastic, returns to its natural state pulling or pushing the bituminous binder to which it has linked.

It is believed that, when used as a traffic surface or as part of a road construction, loads imposed on the macadam cause the rubber to compress. Release of these loads causes the macadam to revert to an unpressed form thereby reducing wear and potentially increasing the life of the road surface.

Conventional macadams do not absorb impact to any high degree. To form a synthetic sports pitch, for example football or hockey, it is necessary to overlay a macadam base (30 to 40 mm depth, one layer or two layers of varying thicknesses) with a rubber shock pad and a long pile (e.g. 23 mm) synthetic carpet, the pile of which is filled with sand. The rubber shock pad usually consists of a particulate or granular ruber, preferably styrene-butadiene rubber, formed into a mat by a resin binder. The shock pad may typically be from 7.5 to 20 mm in thickness. In effect the game is played on sand. The pile of the carpet retains the sand in position, preventing it from heaping up or dispersing. The rubber shock pad provides resilient and impact absorption, enabling the requiremnents of various sporting authorities to be met. The macadam provides a firm base. A synthetic athletics track is similar in construction, but the rubber shock pad is overlaid with a spike resistant flexible surface rather than a sand-filled carpet.

The macadam of the invention, however, is imact absorbing to the standards of BS 7044, BS 7188, BS 5696 and all relevant govering bodies of sport that specify these or similar tests. Accordingly the macadam of the invention can be used to replace both the macadam base and the shock pad of a conventional synthetic sports pitch, simply being overlaid with the sand filled carpet. Likewise the macadam of the invention can be used to replace both the macadam and the rubber/resin base layer of a conventional synthetic athletics track, simply being overlaid with a spike resistant flexible surface.

EXAMPLE

A typical mix consists of
Binder 7.0% rubber grading
10 mm Aggregate 24.0% 100% passing 10.0 mm
6 mm Aggregate 10.5% 35% passing 6.3 mm
Sand 21.3% 0% pausing 4.0 mm
Rubber 35.0%
Filler 1.9%

The binder comprises 7±1% unbranched styrene butadiene styrene block copolymer blended with 93±1% of a compatible bitumen having the following properties.

penetration at 25° C. 90±20 dmn

Softening point 85±10° C.

Storage stability index 75° C.

This mix is based on usage within the United Kingdom at an average ambient temperature of 15° C. Mix ratios may be adapted for use elsewhere, in a manner known to those skilled in the art, to compensate for the ambient temperature of the location.

What is claimed is:

1. An impact absorbing macadam comprising particulate rubber having a particle size of up to 40 mm, an aggregate having a particle size of up to 40 mm and a polymer modified bituminous binder, wherein the rubber comprises from 10 to 75% of the macadam dry weight, the aggregate comprises from 25 to 90% of the macadam dry weight, and the binder comprises from 5 to 9% of the macadam dry weight.

2. The macadam according to claim 1 having voids and a void volume of from 5 to 25%.

3. The macadam according to claim 2 having a void volume of from 15 to 25% wherein the voids are interconnected.

4. The macadam according to claim 2 having an unconnected void volume from 5 to 20% wherein each void is isolated from adjacent voids.

5. The macadam according to claim 1 containing from 25 to 45% by weight of the particulate rubber.

6. The macadam according to claim 1 in which the particulate rubber has a particle size of up to 15 mm.

7. The macadam according to claim 1 containing from 45 to 65% by weight of the aggregate.

8. The macadam according to claim 1 in which the aggregate has a particle size of up to 15 mm.

9. The macadam according to claim 1 containing from 6.5 to 7.5% by weight of the polymer modified bituminous binder.

10. The macadam according to claim 1 in which the polymer modified bituminous binder comprises an unbranched styrene butadiene styrene block copolymer and a bitumen compatible therewith.

11. The macadam according to claim 1 in which the polymer modified bituminous binder comprises a styrene butadiene rubber and a bitumen compatible therewith.

12. The macadam according to claim 1 in which the polymer modified bituminous binder contains from 6 to 8% by weight of the polymer.

13. A roadway formed from an impact absorbing macadam comprising particulate rubber having a particle size of up to 40 mm, an aggregate having a particle size of up to 40 mm and a polymer modified bituminous binder, wherein the rubber comprises from 10 to 75% of the macadam dry weight, the aggregate comprises from 25 to 90% of the macadam dry weight, and the binder comprises from 5 to 9% of the macadam dry weight.

14. A sports pitch having a base formed from an impact absorbing macadam comprising particulate rubber having a particle size of up to 40 mm, an aggregate having a particle size of up to 40 mm and a polymer modified bituminous binder, wherein the rubber comprises from 10 to 75% of the macadam dry weight, the aggregate comprises from 25 to 90% of the macadam dry weight, and the binder comprises from 5 to 9% of the macadam dry weight wherein the macadam is overlaid with a synthetic carpet, the pile of which is filled with sand.

15. An athletics track comprising a base formed from an impact absorbing macadam comprising particulate rubber having a particle size of up to 40 mm, an aggregate having a particle size of up to 40 mm and a polymer modified bituminous binder, wherein the rubber comprises from 10 to 75% of the macadam dry weight, the aggregate comprises from 25 to 90% of the macadam dry weight, and the binder comprises from 5 to 9% of the macadam dry weight wherein the macadam is overlaid with a spike resistant flexible surface.

* * * * *

UNITED STATES PATENT AND TRADEMARK OFFICE
CERTIFICATE OF CORRECTION

PATENT NO. : 6,043,302   Page 1 of 2
DATED : March 28, 2000
INVENTOR(S) : Peter David Spendlove It is certified that error appears in the above-identified patent and that said Letters Patent is hereby corrected as shown below:

Column 1 between Lines 26 and 27 insert --SUMMARY OF THE INVENTION--.

Column 1 Line 34 delete "SUMMARY OF THE INVENTION".

Column 2 Line 21 "met agents" should read --set agents--.

Column 2 Line 35 "emullion" should read --emulsion--.

Column 2 Line 47 "Stress" should read --stress--.

Column 2 Line 62 "granular ruber" should read --granular rubber--.

Column 3 Line 6 "imact" should read --impact--.

Column 3 Line 8 "govering" should read --governing--.

Column 3 Lines 20-26, EXAMPLE format should read as follows:

| | | rubber grading |
|---|---|---|
| --Binder | 7.0% | |
| 10 mm Aggregate | 24.0% | 100% passing 10.0 mm |
| 6 mm Aggregate | 10.5% | 35% passing 6.3 mm |
| Sand | 21.3% | 0% passing 4.0 mm |
| Rubber | 35.0% | |
| Filler | 1.9% --. | |

UNITED STATES PATENT AND TRADEMARK OFFICE
CERTIFICATE OF CORRECTION

PATENT NO. : 6,043,302
DATED : March 28, 2000
INVENTOR(S) : Peter David Spendlove It is certified that error appears in the above-identified patent and that said Letters Patent is hereby corrected as shown below:

Column 3 Line 24 "pausing" should read --passing--.

Signed and Sealed this

Twentieth Day of March, 2001

Attest:

NICHOLAS P. GODICI

Attesting Officer     Acting Director of the United States Patent and Trademark Office